June 6, 1944. H. W. ALEXANDER 2,350,664
APPARATUS FOR GERMICIDAL TREATMENT OF AIR-BORNE BACTERIA
Filed March 13, 1942 2 Sheets-Sheet 1
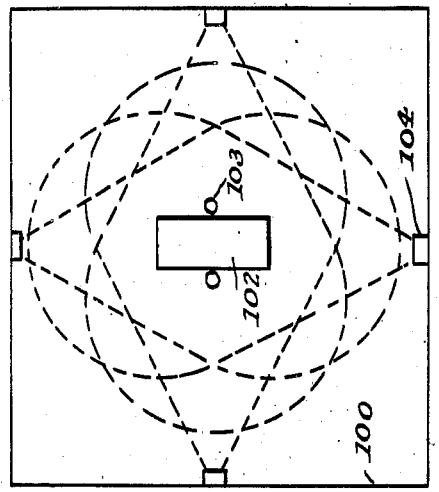
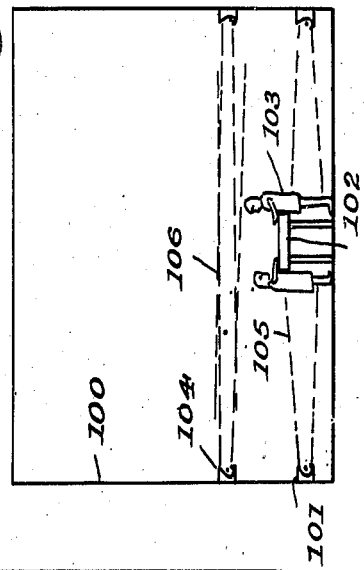
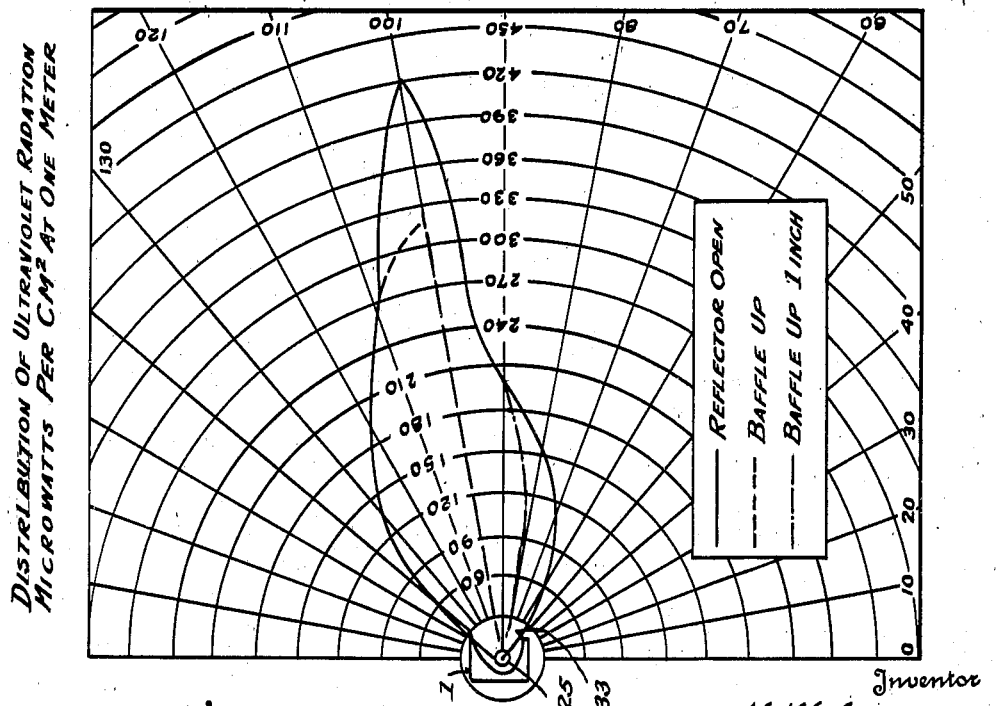
Inventor
H. W. ALEXANDER June 6, 1944.  H. W. ALEXANDER  2,350,664
APPARATUS FOR GERMICIDAL TREATMENT OF AIR-BORNE BACTERIA
Filed March 13, 1942  2 Sheets-Sheet 2
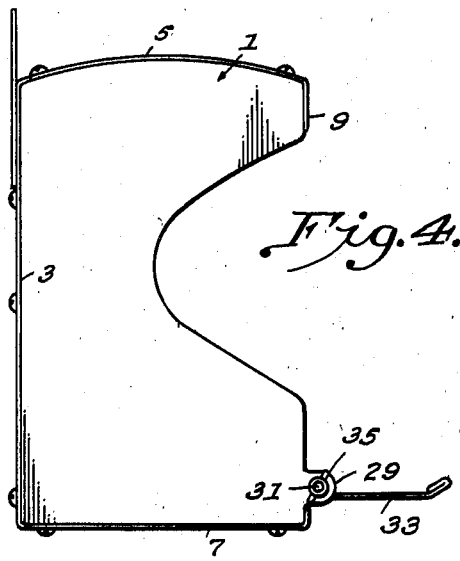
Fig.4.
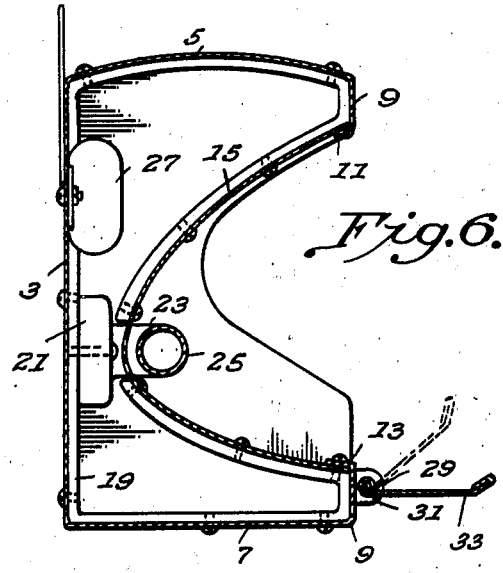
Fig.6.
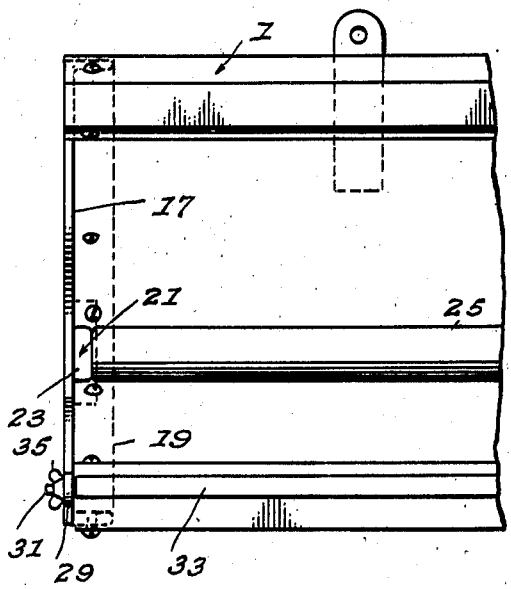
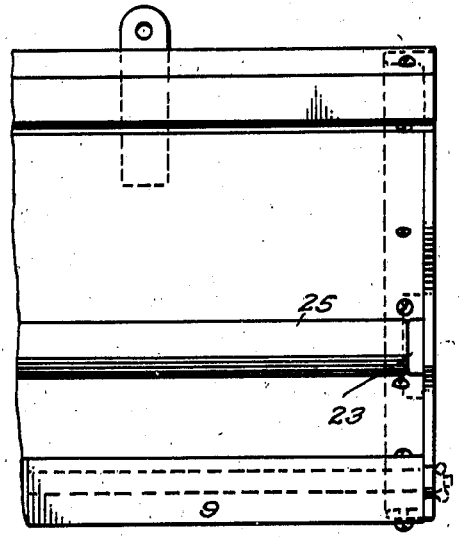
Fig.5.
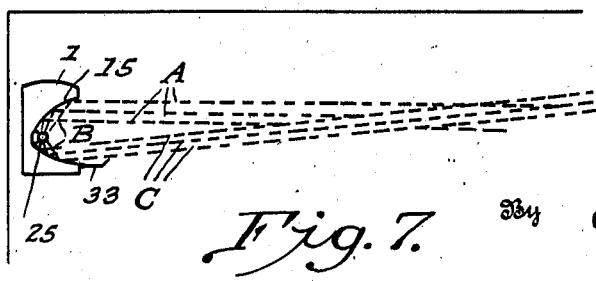
Fig.7.
Inventor
H. W. Alexander
By Leecha Radue
Attorneys Patented June 6, 1944

2,350,664

UNITED STATES PATENT OFFICE 2,350,664

APPARATUS FOR GERMICIDAL TREATMENT OF AIR-BORNE BACTERIA

Horace W. Alexander, Erie, Pa., assignor to American Sterilizer Company, Erie, Pa.

Application March 13, 1942, Serial No. 434,597

6 Claims. (Cl. 250—88)

This invention relates to improvements in a method of and apparatus for germicidal treatment of air-borne bacteria.

More particularly, the invention pertains to a method of and apparatus for creating ultraviolet barriers in spaces such as operating rooms, class rooms and the like, whereby the air-borne bacteria circulated in the space by convection and movement of persons or objects therein is exposed to the lethal rays of ultraviolet radiation generators.

An object of the invention is to provide a method of sterilizing a space, such as an operating room, with a plurality of overlapping, concentrated, lethal, ultraviolet radiations of sufficient potency to sterilize the air as it moves through the beams of lethal rays.

A still further object is to provide an improved germicidal lamp wherein the ultraviolet radiations therefrom are controlled in such a manner that the beam of light therefrom is condensed into a substantially flat, fan-shaped form and with means attached to the lamp for varying the thickness and concentration of the beam.

A still further object includes a specific manner and method of sterilizing the air in an operating room with a plurality of overlapping, horizontal beams adjacent the top and underside of the operating table, whereby the danger of air-borne infection to the patient being operated on is vastly minimized.

Prior workers in the art have recognized broadly the problem of irradiating air with lethal light to minimize air-borne infection, as illustrated in the patent to Gordon M. Fair and William Firth Wells, No. 2,198,867, dated April 30, 1940, and the paper of Professor William Firth Wells entitled "Bactericidal Irradiation of Air," published in the "Journal of the Franklin Institute," vol. 229, No. 3, March, 1940.

This invention contemplates an improvement over these basic studies of air sterilization and includes a novel method of room sterilization and an apparatus, including a lamp casing provided with a reflector and control baffle therefor, whereby the ultraviolet rays of the lamp may be focused in such a manner as to provide a true barrier of lethal concentration.

In the drawings:

Fig. 1 is a diagrammatic, vertical section of an operating room, showing the placement of the ultraviolet irradiators on the side walls thereof and the overlapping of beam barriers.

Fig. 2 is a diagrammatic top plan of an operating room, illustrating the manner in which the beams form an overlapping lethal barrier to air-borne bacteria above and below the operating table.

Fig. 3 is a distribution curve of the ultraviolet radiation of the germicidal lamp in several positions.

Fig. 4 is an end view of the improved lamp casing with the front baffle or hood in fully opened position.

Fig. 5 is a front plan view of the irradiator lamp and reflector therefor, showing its brackets and with the shutter or baffle in lowered position.

Fig. 6 is a transverse, vertical section of the lamp and reflector, showing the irradiator tube mounting and baffle in lowered and partially raised position.

Fig. 7 is a diagrammatic view of the germicidal lamp and indicating the manner in which the rays thereof are reflected in a flat beam when viewed from the side.

It has now been established that ultraviolet radiation of germicidal wave length is an inherently unique agent for the effective killing of air-borne bacteria. Ultraviolet energy is substantially unabsorbed by air and, therefore, without any effect thereon, and the effectiveness of the radiation is limited almost solely by the density of the bacteria in the air and by the distance the radiant energy can travel before being intercepted by a wall or other absorbing medium.

While the present concept includes the method of producing horizontal, overlapping beams of lethal intensity ultraviolet radiation, produced by any form of ultraviolet radiator and projecting apparatus, the invention also specifically includes an apparatus for carrying out this method.

Referring to Figs. 4 to 7, inclusive, it will be observed that the applicant has invented a novel and practical form of projector consisting of an elongated casing 1 having rear, top, and bottom walls 3, 5, and 7, respectively. The forward edges of the top and bottom walls are downturned, as denoted by numerals 9, to lie parallel to the rear wall 3. The extreme inner edges of the portions 9 are further inturned, as indicated by numerals 11 and 13, to form a support for the top and bottom edges of the horizontal, parabolic reflector 15.

The casing 1 and reflector 15 are secured to end members 17 which may be castings or stampings having right angled portions 19. These end members or braces 17 act as end walls for the lamp casing while giving reinforcement and rigidity thereto. Attached to the inner wall of the end angle members 17 is a conventional tube socket 21 whose tube supporting portions 23 extend outwardly at the ends of the reflector 15 for holding a suitable sized germicidal, ultraviolet irradiator 25. The casing also houses a reactor 27 of suitable capacity, and the irradiator 25 is conventionally wired therethrough to a source of potential for energizing the tube. Either integrally formed or suitably attached to the end frames 17 are outwardly projecting, apertured lugs 29 for supporting a horizontal tube or shaft 31 thereon, over which is fastened a baffle or shutter 33. This baffle may be placed in any adjusted position through the medium of end wing nuts 35 whereby the lower rays of the tube 25 may be controlled. Fig. 6 shows the baffle 33 in fully opened position and in dotted lines shows it in partially raised position.

In forming the curved reflector 15, it is so constructed that the rays A and C are directed in substantially parallel paths so that the beam of ultraviolet irradiations has considerable length but comparatively little vertical spread, and, consequently, the reflector contour prevents little reflecting radiation in a direction below the horizontal. Such stray rays are prevented by intercepting the direct irradiation of the tube in a direction below the horizontal means of the baffle 33.

The distribution of ultraviolet radiation in microwatts per square centimeter at one meter distance is plotted on the chart illustrated in Fig. 3. It will thus be appreciated that this type of reflector will give a long, flat, horizontal, fan-shaped beam of ultraviolet radiations of lethal concentration.

In Figs. 1 and 2, there is disclosed the preferred manner of sterilizing the air in an operating room, whereby two distinct lethal barriers are formed and thereby substantially eliminate the danger of air-borne infection to a patient being operated on. In these drawings, 100 denotes an operating room on whose walls are placed a plurality of ultraviolet irradiators, as heretofore described. In placing the irradiators, it is preferable to position a lower series 101 on the walls at a height which will not rise above the operating table 102 but will strike the lower extremities of the operating team 103. A second series of irradiators 104 is positioned slightly above the eye level of the operating team, and thus, there is created two horizontal, substantially flat beamed, overlapping, irradiated areas 105 and 106, respectively. The manner in which these projected beams overlap when projected from the source is diagrammatically shown in Fig. 2.

Thus, a patient lying on table 102 is substantially insulated from air-borne bacteria circulated by reason of the movement of the operating team from below the operating table level and from similar circulation in the upper portion of the operating room 100.

While the use of two vertically spaced, horizontal and oppositely positioned and overlapping beams of ultraviolet radiation is one manner of forming a lethal barrier to air-borne infections, it will be appreciated that if the room is comparatively small, a horizontal barrier may be created by the use of a germicidal lamp placed on the wall of a room slightly above the normal eye level so that the flat beam of light is projected across the room to the opposite wall thereof.

With ultraviolet irradiating tubes of the type now being made and of 30 watts intensity, it is possible, with the use of a lamp housing, as before described, to project a lethal barrier upward to 35 feet in length.

The light ray projector, forming a part of this invention, may also find application over doorways to hospital wards, sick rooms, school rooms and the like and may be used to form a vertical barrier between cubicles or between adjacent beds in a ward.

What I claim is:

1. An ultraviolet projector for use in projecting a substantially flat horizontal fan shaped beam of ultraviolet radiation across a space including an elongated, horizontal casing having an open front wall; a trough-like, unsymmetrical, parabolic reflector mounted in said open front wall; and a tubular ultraviolet generator positioned adjacent and in spaced relation to the point of inflection of said unsymmetrical reflector.

2. An ultraviolet projector of the type defined in claim 1, wherein a horizontal baffle is secured in pivoted, adjustable position at the lower portion of said front wall whereby the lower ultraviolet rays of said projector may be intercepted.

3. An ultraviolet projector including a trough-like reflector whose vertical section is of generally parabolic shape but of unsymmetrical contour, and an elongated, ultraviolet generator positioned outwardly of and across the point of inflection of said generally parabolic reflector, the contour of said reflector being such that the intensity of the beam of said generator when energized and measured at a point in the focal plane of projection at a given distance from said generator is at least twice the intensity of said beam at an angle of 20° above and below said focal plane.

4. An ultraviolet projector including an elongated, unsymmetrical, generally parabolic reflector and an ultraviolet generator tube positioned outwardly from and extending along the point of inflection of said reflector, the contour of said reflector being such as to project the upper, central and lower rays of the said tube in substantially parallel paths in a substantially flat beam of considerable length and comparatively little vertical spread.

5. A germicidal lamp adapted to be mounted on a vertical surface and project a substantially flat horizontal beam of lethal intensity at a right angle thereto comprising the combination of a horizontal, box-like casing having a substantially open front wall; a generally parabolic, trough-like, unsymmetrical reflector secured within the casing and attached to the longitudinal edges of the said front wall; a lamp socket comprising two spaced apart portions secured to the inner rear wall of the casing at the opposite ends thereof behind the said reflector and extending outwardly parallel to the end walls of the casing; and a tube-like, ultraviolet irradiation generator mounted in said spaced socket portions whereby said tube lies adjacent to but spaced from the point of inflection of said unsymmetrical reflector.

6. A germicidal lamp as defined in claim 5, wherein a pivoted baffle plate is mounted from outwardly extending ears positioned at each end of the lower front wall of the casing whereby the baffle may be raised to a degree to control the radiation at the lower portion of the reflector.

HORACE W. ALEXANDER.